(12) United States Patent
Birkner et al.

(10) Patent No.: US 7,681,029 B1
(45) Date of Patent: Mar. 16, 2010

(54) METHOD AND DEVICE FOR CONTROLLING A PORTABLE OBJECT LIFE CYCLE, IN PARTICULAR A SMART CARD

(75) Inventors: Marc Birkner, Cadolive (FR); Jean-Luc Giraud, Aubagne (FR); Laurent Talvard, Auriol (FR)

(73) Assignee: Gemalto SA, Meudon (FR)

( * ) Notice: Subject to any disclaimer, the term of this patent is extended or adjusted under 35 U.S.C. 154(b) by 1165 days.

(21) Appl. No.: 09/831,745

(22) PCT Filed: Nov. 3, 1999

(86) PCT No.: PCT/FR99/02678
§ 371 (c)(1),
(2), (4) Date: Sep. 20, 2001

(87) PCT Pub. No.: WO00/30030
PCT Pub. Date: May 25, 2000

(30) Foreign Application Priority Data

Nov. 13, 1998 (FR) .................................. 98 14517

(51) Int. Cl.
*G06F 9/00* (2006.01)
(52) U.S. Cl. .................... 713/100; 726/26; 713/172
(58) Field of Classification Search ................. 713/172, 713/100
See application file for complete search history.

(56) References Cited

U.S. PATENT DOCUMENTS 5,301,100 A * 4/1994 Wagner ........................ 700/19
5,473,690 A 12/1995 Grimonprez et al.
6,005,942 A * 12/1999 Chan et al. ................... 713/187
6,138,171 A * 10/2000 Walker ......................... 719/318

FOREIGN PATENT DOCUMENTS

EP           0583006 A      2/1994
WO      WO98/09257      3/1998

OTHER PUBLICATIONS

Silberschatz et al.;Database System Concepts; 3rd edition; Mar. 1, 1998; The McGraw-Hill Companies, Inc.; Chapters 2 and 3.*
Harrison et al.; "Protection in Operating Systems"; Aug. 1976; Communications of the ACM; vol. 19, No. 8. pp. 461-471.*

* cited by examiner

*Primary Examiner*—Jung Kim
(74) *Attorney, Agent, or Firm*—Buchanan, Ingersoll & Rooney PC (57) ABSTRACT

The invention concerns a device and a method for controlling a portable object life cycle, in particular a smart card, the life cycle being determined by successive state transitions, which states determine the services offered by the object. The object includes a processing unit, program storage units and data storage units, each storage unit having a content defining a plurality of configurations. The device controls the transition from a first state to a second state of the object and, preferably triggers actions when the transition crossover from one state to another occurs or when a transition crossover request is denied. The actions are dependent on the type of transitions implied in the requests for state transition crossover applied to the object.

36 Claims, 5 Drawing Sheets

METHOD AND DEVICE FOR CONTROLLING A PORTABLE OBJECT LIFE CYCLE, IN PARTICULAR A SMART CARD

This disclosure is based upon, and claims priority from French Application No. 98/14517, filed on Nov. 13, 1998 and International Application No. PCT/FR99/02678, filed Nov. 3, 1999, which was published on May 25, 2000 in a language other than English, the contents of which are incorporated herein by reference.

BACKGROUND OF THE INVENTION

The invention concerns portable electronic objects such as electronic microcircuit cards, known as smart cards, which, connected to electronic devices to enable the latter to perform particular functions in the context of one or more applications, require their life stages to be controlled. The said cards are in fact generally used in applications (banking, communication, identity, health etc) requiring a high degree of security against fraudulent usage. Thus, by way of example, the document U.S. Pat. No. 5,473,690 presents a smart card comprising several applications, access to which is protected by passwords, a password being dedicated to a user. Knowing a password, it is possible to select one application or another. However, it is not possible to deactivate an application or limit the use thereof whatever the user of the card as a function of the life stages of the said card.

The invention applies more generally to any independent on-board system provided with a processing unit and program and data memories.

In the world of smart cards it is known that the latter result from assembling a component (generally comprising a microprocessor in relationship with memories via communication buses), a module (produced by means of a conductive metal) to which the said component is connected (in the context of a so-called contact smart card) to enable the said component to be connected to an electronic reading and/or writing device (or coupler) and a card body or more generally a support on which the module/component assembly is integrated. In the context of a so-called contactless smart card, the said module is replaced by an antenna and the assembly formed by the component and the said antenna is integrated within the said support.

The life of a smart card can generally be broken down into two sets of stages following each other, corresponding respectively to the manufacture and use of the said card. Putting together the two sets of stages forms a life cycle of the said card. The manufacture of a smart card (with or without contact) consists of several stages.

This is because it is first of all necessary to have an electronic component which is initialised, insulated and then connected to a module. The said component and the module to which it is connected are subsequently integrated on or within a support (generally a plastic card body) itself printed for the purpose of identification or advertising. Subsequently the smart card thus obtained is initialised or programmed in order to meet the conditions of use in the context of applications.

The second set of life stages of a smart card corresponds to its use. This set can itself be divided into several stages, each corresponding, for example, to the implantation or elimination of services offered by the smart card to the user according to his profile, for example.

In addition different participants (component manufacturer, smart card manufacturer, card personalisation centre, card issuer or card carrier) act during the different stages of manufacture and use of a smart card. Thus the components are supplied and sometimes partly initialised by electronic component manufacturers on a silicon wafer. This phase corresponds to the step of manufacturing the component. The following step is the embedding phase carried out by the smart card manufacturer. It includes the insulation of a component from the silicon wafer, the connection of the said component to a module (or antenna), and the integration of the assembly on the support or card body. There follows the preparation of the application structure present in the electrically programmable memory of the component. This is the electrical personalisation stage which is carried out by the manufacturer of the smart cards or by a personalisation centre or a third party specialising in personalisation of cards or by the issuer himself who is ultimately responsible for the distribution of the cards on the market. This electrical personalisation phase can therefore be broken down into as many stages as there are players or intermediaries. Subsequently, during the use of the smart card, we have seen previously that it can be advantageous to distinguish several stages along with the change in the profile of the card user for example. For all these reasons, it is therefore important to rigorously monitor the life stages of a card in order to know at any time the current stage of the said card within its life cycle. In addition, it is essential on the one hand for access to the electrically programmable memory of a card component in write or read mode to be protected during the exchange of the said card (or component) during the different players and on the other hand for access to the said memory to be limited as the life stages of the card mentioned above follow each other, by activating or deactivating services for example. Finally, it is also sometimes necessary to validate the application context of the smart card before the carrier thereof uses it on the market. For example, a person issuing a smart card of the electronic purse type must be certain that the balance of the said card is indeed zero before issuing the card.

In order to attempt to meet these requirements, different solutions are used at the present time. Certain solutions are purely external to the smart card (physical security at the premises where the said card is manufactured, use of transportation means which are themselves made secure etc). Other solutions complementary to the first, but this time internal or implanted in the card, are also generally used. Use is thus made of secrets for protecting access to the component memory in read/write mode and also logic indicators for irreversibly monitoring the different life stages of the card. For this purpose, bits within a non-erasable memory of the component of the smart card are positioned at the active state at the end of the different life stages of the card (manufacture and initialisation of the component by the manufacturer of the said component, embedding and initialisation of the card memory by the smart card manufacturer, preparation of the application structure of the smart card memory by the personalisation centre or the card issuer etc). According to these indicators, the program (or operating system) executed by the microprocessor of the smart card component, implanted within one of the memories of the said card component, adapts its behaviour as the life stages of the said card follow each other. Thus functions can be modified, added or eliminated.

Whatever the solutions used at the present time, they are all based on the fact that the different players involved in the manufacture of a card are trusted third parties. Only persons liable to intercept components or cards during their transfer between two of the different players are deemed to be "potential fraudsters" and the solutions disclosed above make it possible to be free of them. The adaptation of the operating system of the card according to irreversible indicators affords a not insignificant advantage. Thus, if the manufacturers of the components or cards inscribe systems data or secrets, the card issuer will for example not be able to dispense freely with the said secrets or modify the said system data. However, this solution does not resolve the problem of a fraudulent initialisation of the card or an inopportune error during the said initialisation, carried out by one of the participants.

SUMMARY OF THE INVENTION

The invention proposes to remedy the drawbacks of the current state of the art. In particular, the invention consists of providing the operating system of a smart card with software means enabling the said operating system to control an irreversible change in life stage of the said card according to a set of checks on the content of the memories of this same smart card. In addition the invention makes provision, during a change in life stage, for the operating system of the card to be able to automatically trigger actions for adapting the services offered by the said operating system of the said card.

To this end, the invention concerns a device for controlling the life cycle of a portable electronic object, the life cycle consisting of a succession of state transitions, the said states determining the services offered by the object, the said object comprising a processing unit, a volatile memory, program memories and data memories, each of these memories having a content defining a plurality of configurations, characterised in that it has means of controlling the transition from a first state to a second state of the portable electronic object.

According to other characteristics of the device according to the invention:

the control means have:

means of enabling and/or inhibiting state transitions to be effected;

means of checking the content of the volatile memory, of the data memories and of the program memories of the portable electronic object according to the state transition to be effected;

means for triggering actions during the processing of a request to effect a state transition.

In addition, the invention concerns a portable electronic object, which may notably be a smart card, containing the said life cycle control device.

Moreover, the invention concerns a method of controlling the life cycle of a portable electronic object, the said method being implemented within the object following a state transition request, characterised in that it comprises:

a step of validating the enabling of the said request;

a step of evaluating the checks associated with the requested transition;

a step of modifying the current state of the object if and only if the requested transition is enabled and if the checks on the configuration of the object are satisfied.

According to other characteristics, the method possibly also comprises:

a step of executing systematic actions;

a step of executing positive actions in the case where the requested transition is enabled and if the checks associated with the requested transition are satisfied;

a step of executing negative actions in the case where the checks associated with the requested transition are not satisfied.

BRIEF DESCRIPTION OF THE DRAWINGS

The invention will be understood more clearly from a reading of the following description and an examination of the figures which accompany it. These are given only as an indication and are in no way limitative of the invention.

The figures show.

DETAILED DESCRIPTION

In the invention, the term reference state will refer to a state from which it is possible to switch to another state following the crossover of a transition described in the table of transitions, located in the program memory. As described below, it is possible to add new states and therefore new transitions after the step of manufacturing the component has taken place. In this case, additive states will be spoken of in order to characterise these in contradistinction to reference states. In addition, the state in which the on-board system is will be referred to as the current state.

Figure 1:
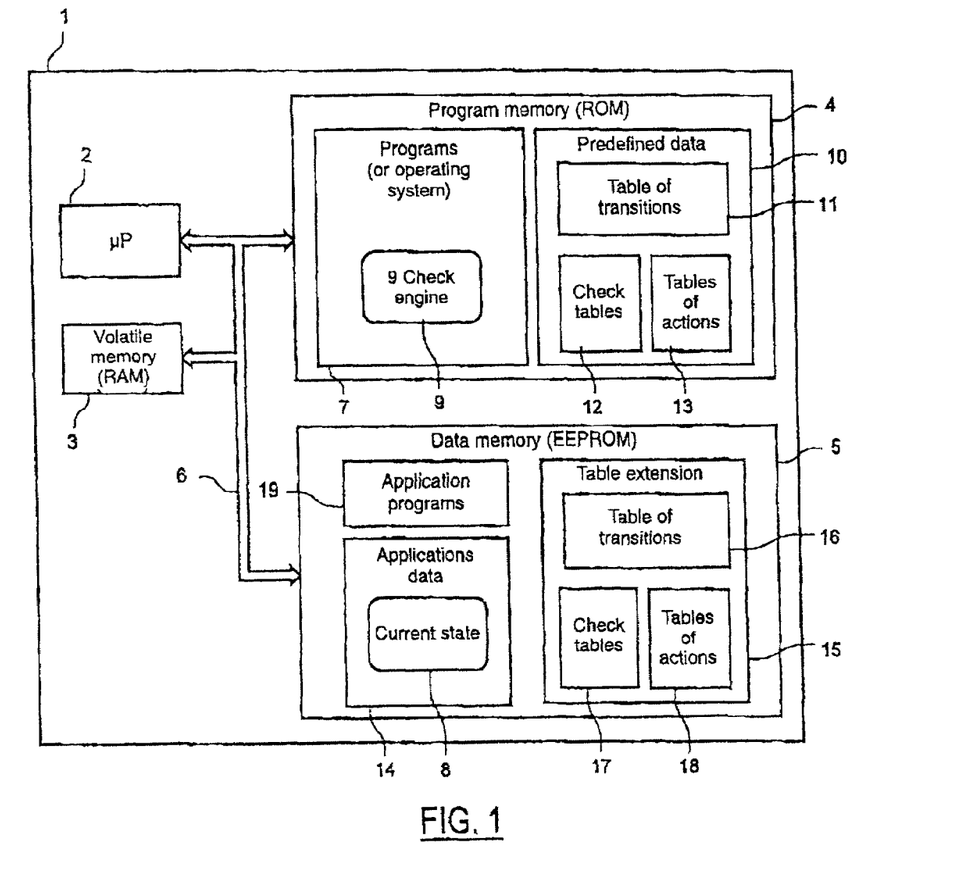
FIG. 1: a component of a smart card provided with a state transition check device.

FIG. 1 shows a component 1, of a smart card, provided with a transition check device according to the invention. The component has a processing unit 2 or a microprocessor in relationship with memories 3, 4 and 5 via a communication bus 6. A non-erasable program memory 4 (or a ROM) has on the one hand a program area 7, the said programs (or on-board system) being able to be executed by the said processing unit and on the other hand a predefined data area 10 which contains constants used by the said operating system. Amongst the said constants of the area 10, the operating system 7, containing a program referred to as a check engine 9, uses a table of transitions 11 which makes it possible to specify the states to which it is possible to gain access from the current state, a check table 12 which makes it possible to associate with each state transition checks relating to the content of the memories 3, 4 and/or 5. In a variant, the check engine 9 can automatically trigger actions when a transition is crossed over or this crossover is rejected. For this purpose, the area 10 of the program memory contains a table of actions 13 which makes it possible to associate actions to be performed with each possible state transition.

A volatile memory 3 (or RAM, standing for Random Access Memory in English) enables the processing unit 2 to temporarily store results or secrets issuing from calculations described by the programs implanted in the program memory 4. The content of the memory 3 is erased each time the component 1 is powered up or each time resetting thereof is requested.

A data memory 5, electrically erasable, generally using EEPROM technology (standing for Electrically Erasable Programmable Read Only Memory in English) has an area 14 containing the variable data necessary for executing the programs 7. This area 14 contains notably a data item 8 referred to as the "current state" making it possible to store the current state of the portable electronic object. The data memory 5 also has an area 15 comprising optionally extensions to the tables 11 to 13 in the case where it is necessary to add states to the reference states. The area 15 then contains an extension to the table of transitions 16 and an extension to the check table 17 and may include an extension to the table of actions 18 if it is wished to associate actions with the new additive state transitions, as seen previously with regard to table 13. In the case of adding states with respect to the reference states, it is sometimes essential to enhance the operating system 7. For this purpose, the memory 5 can also include an area 19 which contains the additional programs which will be executed in their turn by the processing unit 2.

Figure 2A:
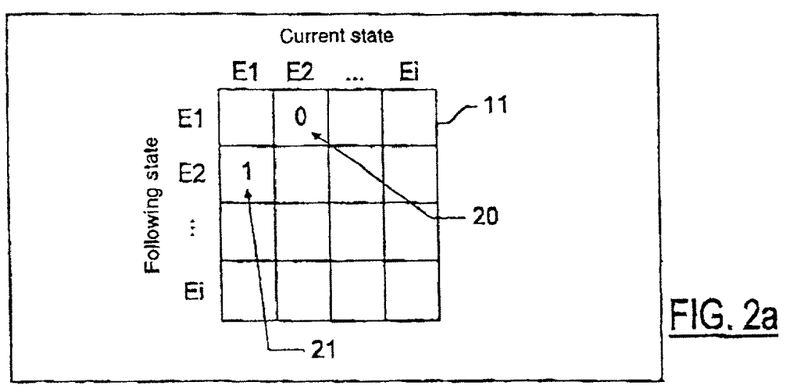
FIGS. 2a and 2b: a detailed representation of a state transition table.

FIG. 2a shows a possible use of the table of transitions 11. If it is assumed that i reference states are counted, it is possible to imagine a transition table comprising i columns and i rows. The columns correspond to the reference states which, at a given time, can be the current state. The first i rows correspond to the reference states to which access can be gained from the current state. Thus the value of a box in the table of transitions 11 corresponding to the intersection of a row and column in the said table makes it possible to code either the absence of an enabled transition (zero value for example—this is the case with the transition 20) or the enabling of a transition (non-zero value—this is the case with the transition 21). In the case of an enabled transition, the transition check engine searches within the check table 12 the checks to be made in order to accept or reject the crossover of the requested transition.

Figure 2B:
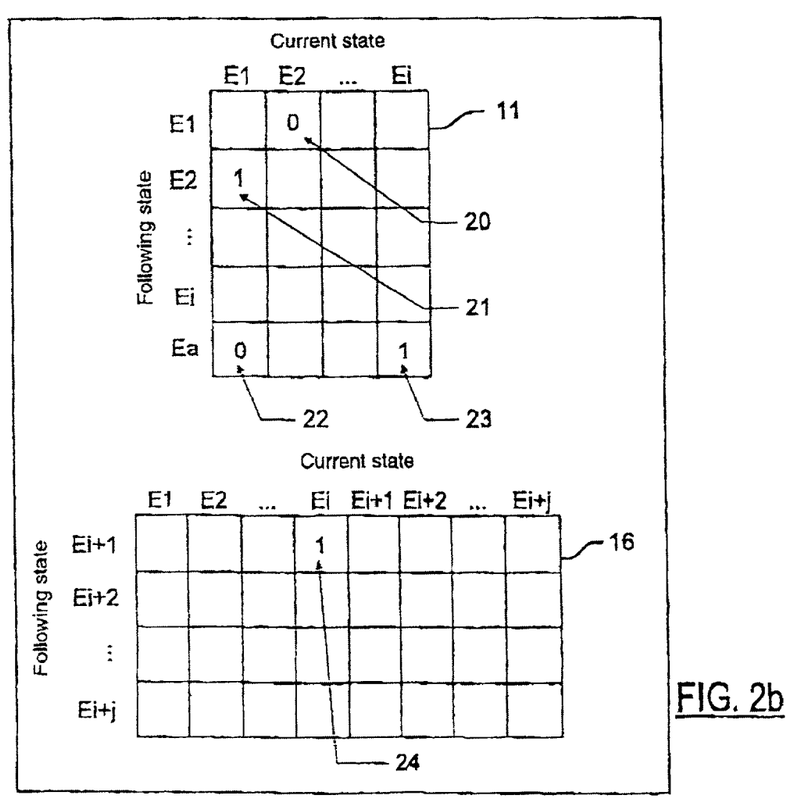

FIG. 2b also shows a possible implementation of a transition table in the case where it is possible to add states (additive states) to the reference states. The table of transitions includes an additional line compared with FIG. 2a. The (i+1)th line makes it possible to specify if transitions from a current reference state to an additive state are enabled. Thus the value of the box 22 indicates an inhibited transition from a reference state to an additive state. The box 23 indicates that it will be possible to switch from the reference state Ei to an additive state. An extension 16 to the table of transitions is then necessary. The latter has j lines corresponding to j additive states to which it is possible to gain access from the (i+j) possible current states represented by the (i+j) columns of the extension 16 to the table of transitions. Thus the combination of the box 23 in the table of transitions and the box 24 of the extension 16 of the table of transitions indicates to the check engine that it is possible to switch from the reference state Ei to the additive state E(i+1).

Figure 3:
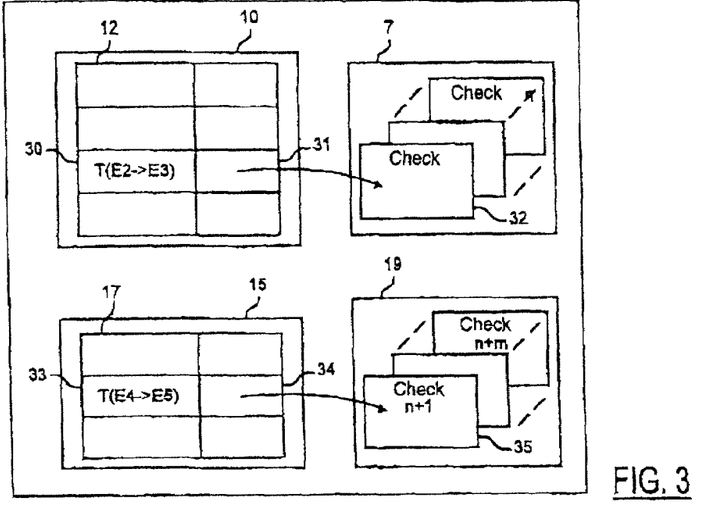
FIG. 3: a detailed representation of a transition check table.

FIG. 3 shows a use of the check table. The check table 12 is located within the area 10 of the predefined data of the memory 4. Each enabled transition has an entry in the said table. An entry comprises a field 30 for identifying the transition and a field 31 containing a reference (or address) to a program 32 of the operating system 7. The check engine 9 can thus make the processing unit 2 execute the required controls for accepting the crossover of the transition. FIG. 3 also illustrates a structure of an extension 17 to the check table. In the same way as with the table 12, the extension to the check table 17 has one entry per possible transition. Each entry comprises two fields, a field 33 for identifying the transition and a field 14 containing a reference (or address) of a program 35 of the operating system or, as shown by FIG. 3, an additional program located in the data memory 5 (in the area 19).

Figure 4:
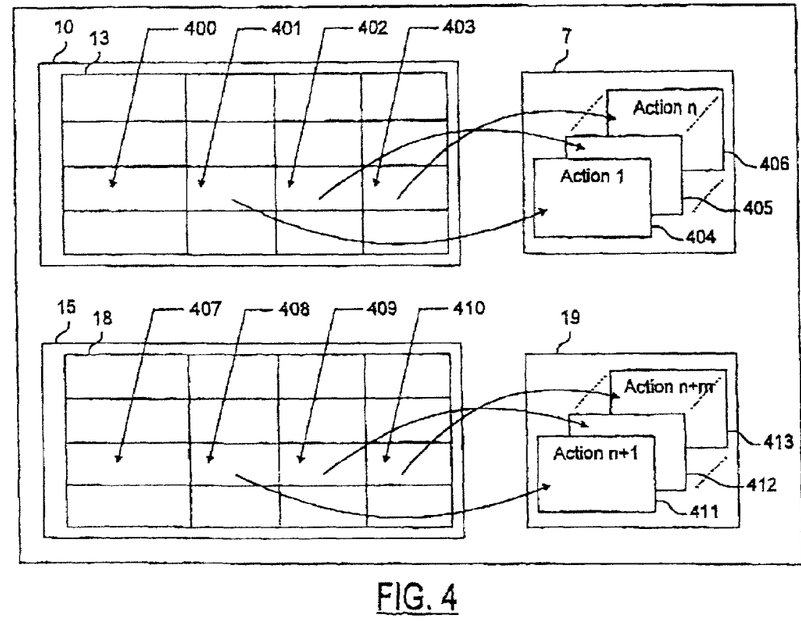
FIG. 4: a detailed representation of an action table.

FIG. 4 shows a representation of the table of actions 13 located in the area 10 of the predefined data of the program area 4. At the time of a transition crossover request, it is possible to trigger actions. These can be of three types: systematic action, positive action (that is to say dependent on the fact that the checks are satisfactory) or negative action (that is to say dependent on the fact that the checks are not satisfactory). FIG. 4 shows that, at each enabled transition, there is an entry in the table of actions 13. This entry comprises four fields. The first field 400 identifies the transition. The other three fields 401, 402 and 403 each contain a reference or address of a program 404, 405 or 406 of the operating system. The field 401 is dedicated to a systematic action, the field 402 to a positive action and the field 403 to a negative action. FIG. 4 also shows an extension 18 to the table of actions. This table 18 is located in the area 15 of the data memory 5 of the component 1. In the same way as with the table of actions 13, the extension to the table of actions 18 comprises one entry per possible transition. An entry comprises four fields. The first field 407 identifies the transition. The other three fields 408, 409 and 410 each contain a reference or address of a program 411, 412 or 413 of the operating system or, as shown by FIG. 4, programs located in the area 19 of the data memory 5 of the component 1. The field 408 is dedicated to a systematic action, the field 409 to a positive action and the field 410 to a negative action.

Figure 5A:
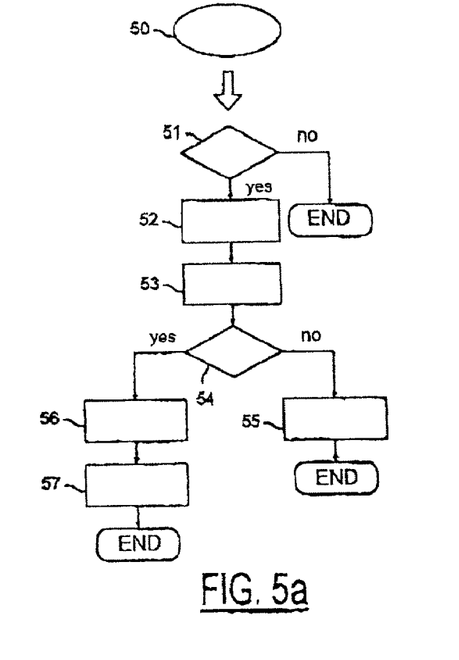
FIG. 5: a description of the steps implemented in the method used by the transition check device.

FIG. 5a describes the method for validating or rejecting the crossover of a state transition, from a first reference state to another reference state. The request for crossover of a transition can be formulated following an instruction from the card manufacturer or by any other player in the life cycle of the smart card. The said request can also be formulated directly by the card itself, for example through an action associated with a transition. In the context of FIG. 5a, the current reference state is the state Ei. The instruction 50 to switch from the state Ei to the state Ej is formulated. Step 51 consists of checking, within the table of transitions 11, that the transition from the state Ei to the state Ej is enabled. Where this transition is inhibited, the transition crossover request 50 is rejected. The current state remains the state Ei. On the other hand, if the transition is enabled, the check engine 9 executes the checks associated with the said transition. For this purpose the check engine evaluates the entry in the check table 12 dedicated to the transition T(Ei→Ej). The execution of said checks corresponds to step 52 of the method. The check engine 9 executes the systematic actions associated with the transition T(Ei→Ej) according to the entry in the table of actions 13 dedicated to the said transition (step 53). If the checks 54 required at the time of the request for crossover of the transition 50 are not satisfactory, the current state remains unchanged. According to the entry in the table of actions 13 associated with the transition T(Ei→Ej) the check engine executes the negative actions (step 55 of the method). The performance of the method is then terminated. On the other hand, if the checks 54 are satisfactory, then the current state becomes the state Ej (step 56 of the method). The positive actions are then executed (step 57 of the method) according to the state of the entry in the table of actions 13 associated with the transition T(Ei→Ej). The performance of the method is terminated.

Figure 5B:
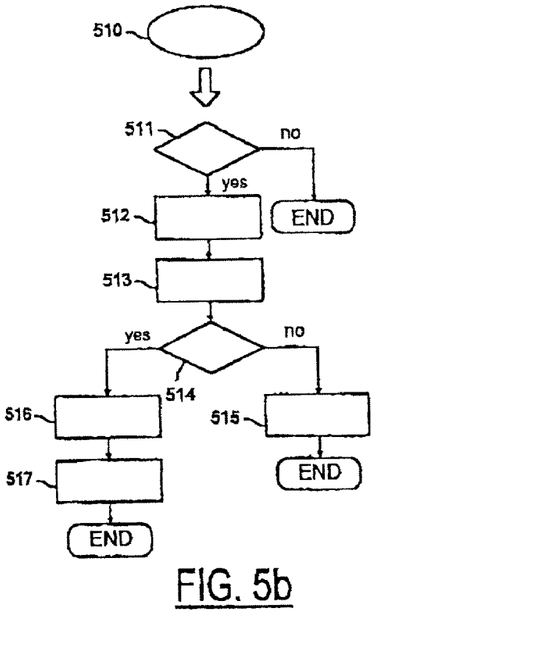

FIG. 5b describes the method for validating or rejecting the crossover of a state transition, from a first additive state to another additive state. The current additive state is the state Ei. The instruction 510 to switch from the additive Ei to the additive state (or reference state) Ej is formulated. Step 511 of the method consists of checking within the extension to the table of transitions 16 that the transition from state Ei to state Ej is enabled. Where this transition is inhibited, the transition crossover request 510 is rejected. The current state remains the state Ei. On the other hand, if the transition is enabled, the check engine 9 executes the checks associated with the said transition. For this purpose, the check engine evaluates the entry in the extension to the check table 17 dedicated to the transition T(Ei→Ej). The execution of the said checks constitutes step 512 of the method. The check engine 9 executes the systematic actions associated with the transition T(Ei→Ej) according to the entry in the extension to the table of actions 18 dedicated to the said transition (step 513 of the method). If the check 514 required at the time of the transition crossover request 510 is not satisfactory, the current state remains unchanged. According to the entry in the extension to the table of actions 18 associated with the transition T(Ei→Ej), the check engine 9 executes the negative actions (step 515 of the method). The performance of the method is then terminated. On the other hand, if the checks 514 are satisfactory, the current state becomes state Ej (step 516 of the method). The positive actions are then executed (step 517 of the method) according to the state of the entry in the extension to the table of actions 18 associated with the transition T(Ei→Ej). The performance of the method is terminated.

Figure 5C:
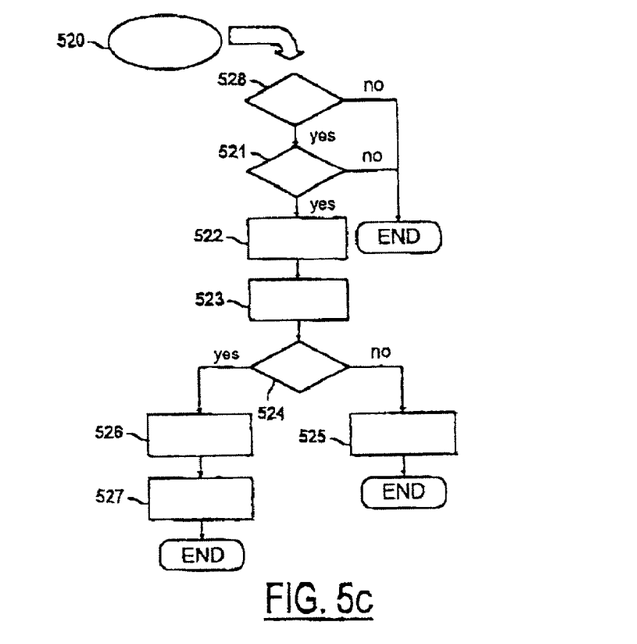

FIG. 5c describes the method for validating or rejecting the crossover of a state transition, from a reference state to an additive state. The current reference state is the state Ei. The instruction 520 to switch from the reference state Ei to the additive state Ej is formulated. Step 528 of the method consists of checking, within the table of transitions 11, that a transition from the current reference Ei to an additive state is enabled. If such a transition is inhibited, the method is terminated. The current state remains unchanged. On the other hand, if a transition from the said reference state to an additive state is enabled, the check engine runs steps 521 to 527 of the method, respectively identical to steps 511 to 517 described in relation to FIG. 5b.

Figure 6A:
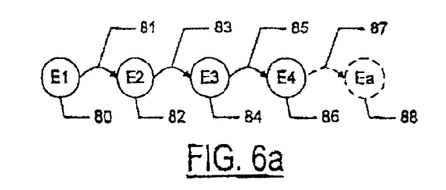
FIGS. 6a to 6d: the particularities implemented in the case of an example of a smart card of the electronic purse type.

An example of an application in the field of electronic purses is presented in relation to FIGS. 6a to 6d. The said application makes it possible to pay for purchases by means of "electronic money" stored in a smart card, instead of paying in cash. The use of such a technique requires a management of the cards which is as secure as that which would have been imposed by the use of cash. It is necessary for example to avoid the creation of paper money. The security of an electronic purse smart card is generally based on keys stored within the smart card allowing secure transactions using cryptography. Such a card has an operating system offering a set of commands and services for crediting or debiting money. At the start of the life cycle of the electronic purse smart card, the said smart card is not initialised. It contains no information. FIG. 6a shows the predefined reference states:

State E1 "blank card" (referenced 80): only test commands for validating the behaviour of the data memory 5 are available (verification that the EEPROM technology memory boxes can be correctly written to and erased);

State E2 "tested card" (referenced 82): the test commands are no longer available. In their turn commands generally known as "physical commands" (allowing access in write mode by means of a physical addressing independently of any logic structure of the file type for example) are available. They make it possible to initialise the card (writing in the area 14 of the data memory of the logic constituents necessary for the functioning of the application, that is to say files, balances etc);

State E3 "initialised card" (referenced 84): the physical commands are no longer available. Logic commands for personalising the card (addition of new logic structures and initialisation data in the said structures) can be used. In addition, a recovery mechanism is activated so that the smart card does not lose the coherence of these data when it is powered down during the execution of one of the said logic commands;

State E4 "personalised card" (referenced 86) the logic commands specific to the electronic purse application (debit/credit) are activated.

The set of available commands changes according to the life stage in which the smart card is situated. Information stored in data memory enables the operating system to know the state in which the smart card is situated. FIG. 6a also shows that, in the context of a card of the electronic purse type, all the transitions between reference states must be crossed successively (from state E1 to state E4), and this irreversibly. Any other transition is inhibited. Only the possibility of subsequently using additive states 88 is offered. This possible transition is referenced 87. The operating system according to the current state allows only a set of commands specific to each reference state.

Figure 6B:
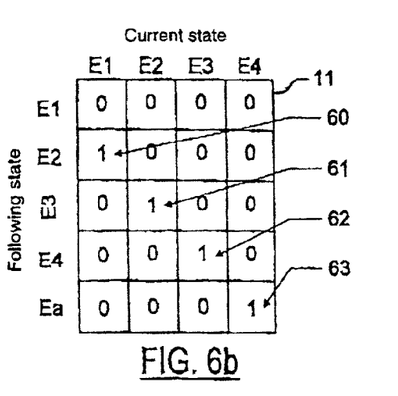
Figure 6C:
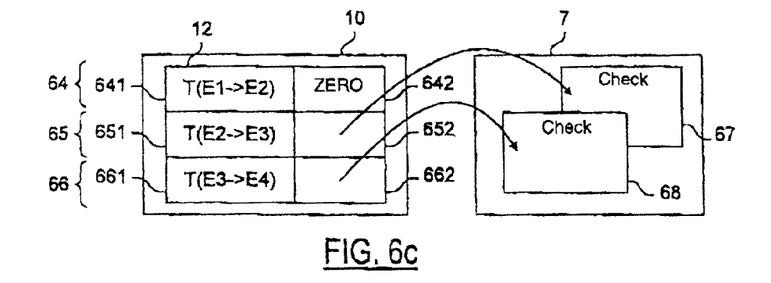
Figure 6D:
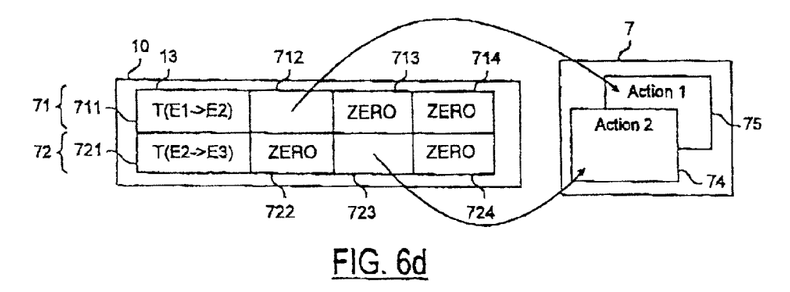

The checks and actions to be triggered when a transition is crossed are described as follows:

Transition from state E1 to state E2 (denoted T(E1→E2) and referenced 81):
Check: none
Systematic action:
erasure of the data memory in order to prevent a fraudster leaving therein data which can be interpreted by the card operating system;

Transition from state E2 to state E3 (denoted T(E2→E3) and referenced 83):
Check:
integrity of the data written in the data memory with the physical commands (validation of a redundancy code by data);
verification of the blank state of the memory apart from the said data;
Positive action:
activation of the recovery mechanism;

Transition from state E3 to state E4 (denoted T(E3→E4) and referenced 85):
Verification:
nullity of the balance of the electronic purse
Action: none Transition from state E4 to an additive state (denoted T(E4→Eadd) and referenced 87):
Verification: none
Action: none FIGS. 6b to 6d illustrate respectively an embodiment of a table of transitions 11, a check table 12 and a table of actions 13, according to the invention. The table of transitions 11 as described in relation to FIG. 6b makes it possible to enable only the transitions 81, 83, 85 and 87. For this, only the boxes 60 to 63 in the said table contain a non-zero value. The other boxes in the table of transitions contain a zero value in order to indicate that any other transition is inhibited. The check table as presented through FIG. 6c makes it possible to associate the checks to be satisfied for enabling the crossover of the transitions 81, 83, 85 and 87, the said transitions enabled by the table of transitions 11 (FIG. 6b). Thus the entry 64 in the check table 12 includes a field 641 for identifying the fact that the said entry is dedicated to the transition 81. The entry 64 also includes a field 642 containing a zero reference in order to indicate that no check is requested in order to allow the crossover of the transition 81. In a variant, the transition 81 has no associated entry. This variant is illustrated later in the case of the table of actions. The check table 12 has an entry 65 which comprises respectively a field 651 for indicating that the entry is associated with the transition 83 and a field 652 containing the reference of a program 67, located in the program memory, so that the check engine can make the checks described above. Likewise, the check table 12 has an entry 65 which comprises respectively a field 661 for indicating that the entry is associated with the transition 83 and a field 662 containing the reference of a program 68, located in the program memory, so that the check engine can make the previously described checks.

FIG. 6d presents an embodiment of the table of actions 13. The said table has an entry 71 which includes a field 711 for indicating that the said entry is associated with the transition 81. The same entry 71 has a field 712 containing the reference of a program 75, located in the program memory, so that the check engine can execute the systematic actions associated with the transition 81. The entry 71 also has a field 713 and a field 714 containing a zero reference in order to indicate to the check engine that no positive or negative action is associated with the crossover of the transition 81. In the same way, the table of actions 13 has a second entry 72 comprising the fields 721 to 724 in order to indicate to the check engine that the said entry is associated with the transition 83, that the program 74 is to be executed as a positive action when the said transition is crossed and that no systematic or negative action is to be executed. The absence of entry, within the table of actions 13, associated with the transition 85, indicates that no action (systematic, positive or negative) is to be executed at the time of crossover or rejection of crossover of the said transition.

By means of the device and method as described above, the life cycle of a portable electronic object is controlled. Each state transition is irreversible and the checks made at the time of each transition request guarantee a coherent memory configuration for the object. In addition, the systematic, positive or negative actions make it possible to adapt the behaviour of the said object. Finally, in the case where provision is made for enabling one or more transitions from one or more reference states to an additive state, the life cycle of the object can easily be enhanced, for example after the object is issued on the market, without the predefined life cycle (composed of a succession of transitions from one reference state to another reference state) being able to be diverted.

Any risk of fraud during the initialisation of a portable electronic object or of an inopportune error during the said initialisation is removed whilst preserving great adaptability of control of the life cycle of the object.

The invention claimed is:

1. A device for controlling the life cycle of a portable electronic object, the life cycle being determined by a succession of state transitions, said states determining the services offered by the object, said object comprising a processing unit, a volatile memory, program memories and data memories, each of said memories having a content defining a plurality of configurations, wherein said device comprises means for controlling the transition from a first state to a second state of the portable electronic object, including means for selectively enabling and/or inhibiting state transitions, and means for checking the content of the volatile memory, the data memories and the program memories of the portable electronic object as a function of the state transition to be effected, so that only some transitions are permitted amongst all the transitions between any two possible states of the portable electronic object.

2. A device according to claim 1, wherein the control means enable and/or inhibit a state transition, using a table of permitted state transitions.

3. A device according to claim 2, wherein the control means comprise:
   in addition to the table of permitted state transitions;
   a table of the checks to be made per permitted state transition;
   and a check engine using said tables.

4. A device according to claim 2, wherein the means for controlling the transition from a first state to a second state of the portable electronic object comprise:
   an extension to the table of permitted state transitions.

5. A device according to claim 3, wherein the means for controlling the transition from a first state to a second state of the portable electronic object comprise:
   an extension to the table of permitted state transitions;
   an extension to the table of checks to be made per permitted state transition;
   and wherein the check engine uses said table extensions.

6. A device according to claim 1, wherein the control means comprise means for triggering actions during the processing of a request for transition crossover from a first state to a second state of the portable electronic object.

7. A device according to claim 6 wherein said controlling means includes:
   an extension to the table of permitted state transitions;
   an extension to the table of checks to be made per permitted state transition;
   and wherein the check engine uses said table extensions; and
   wherein said means for triggering actions during the processing of a request for transition crossover from a first state to a second state of the portable electronic object comprise a table of actions which can be used by the check engine.

8. A device according to claim 7, wherein the means for triggering actions during the processing of a request for transition crossover from a first state to a second state of the portable electronic object comprise an extension to the table actions which can be used by the check engine.

9. A portable electronic object having a processing unit, a volatile memory, program memories, data memories, and a device for controlling the life cycle of the object comprising means for controlling the transition from a first state to a second state of the portable electronic object, including means for selectively enabling and/or inhibiting state transitions, and means for checking the content of the volatile memory, the data memories and the program memories of the portable electronic object as a function of the state transition to be effected, so that only some transitions are permitted amongst all the transitions between any two possible states of the portable electronic object.

10. A smart card having a processing unit, a volatile memory, program memories, data memories, and a device for controlling the life cycle of the object comprising means for controlling the transition from a first state to a second state of the smart card, including means for selectively enabling and/or inhibiting state transitions, and means for checking the content of the volatile memory, the data memories and the program memories of the smart card as a function of the state transition to be effected, so that only some transitions are permitted amongst all the transitions between two possible states of the smart card.

11. A method of controlling the life cycle of a portable electronic object, the life cycle being determined by a succession of state transitions, said states determining the services offered by the object, said object comprising a processing unit, a volatile memory, program memories and data memories, each of said memories having a content defining a plurality of configurations, said method being implemented, within the object, following a request to transition from a current state to a new state, according to the following steps:
   a step of validation of the enabling of said request using means for enabling and/or inhibiting state transitions, so that only certain transitions are permitted amongst all the transitions between any two possible states of the object;

a step of evaluating checks on the configuration of the object that are associated with a permitted transition; and a step of changing to the new state of the object if the requested transition is enabled and if said checks on the configuration of the object are satisfied.

12. A method according to claim 11, further comprising a step of executing systematic actions associated with the requested transition.

13. A method according to claim 11, further comprising a step of executing positive actions performed if the requested transition is permitted and if the checks associated with the requested transition are satisfied.

14. A method according to claim 11, further including a step of executing negative actions if the checks associated with the requested transition are not satisfied.

15. A method according to claim 11, further including a step of executing positive actions if the requested transition is permitted.

16. A method according to claim 11, implemented within the object, following a request for transition, wherein the step of validating the enabling of the said request comprises analysing a table of permitted transitions.

17. A method according to claim 16, including the steps of:
using an entry, corresponding to the requested transition, in a table of actions, and
executing a program of actions defined by said entry.

18. A method according to claim 16, further including the step of evaluating the checks associated with the requested transition comprising the steps of:
using an entry in a table of checks, and
executing a program of checks defined by said entry.

19. A method according to claim 16 further including the step of executing positive actions, if the requested transition is enabled and if the checks associated with the requested transition are satisfied, comprising the steps of:
using an entry, corresponding to the requested transition, in a table of actions, and
executing a program of actions defined by said entry.

20. A method according to claim 16 further including the step of executing negative actions if the checks associated with the requested transition are not satisfied, comprising the steps of:
using an entry, corresponding to the requested transition, in the table of actions, and
executing a program of actions defined by said entry.

21. A method according to claim 16, further including the step of executing positive actions if the requested transition is enabled, comprising the steps of:
using an entry, corresponding to the requested transition, in the table of actions, and
executing program of actions defined by said entry.

22. A method of controlling the life cycle of a portable electronic object, the life cycle being determined by a succession of state transitions, said states determining the services offered by the object, said object comprising a processing unit, a volatile memory, program memories and data memories, each of said memories having a content defining a plurality of configurations, said method being implemented, within the object, following a request for transition from a first additive state to a second additive state, comprising the steps of:
validating the enabling of said request by analysing an extension to a table of permitted transitions, so that only certain transitions are permitted amongst all the transitions between any two possible states of the object; and
changing the state of the object to the second additive state if the requested transition is enabled.

23. A method according to claim 22, further including the step of executing systematic actions comprising the steps of:
using an entry, corresponding to the requested transition, in an extension to a table of actions, and
executing a program of actions defined by said entry.

24. A method according to claim 22, further including the step of evaluating the checks associated with the requested transition, comprising the steps of:
using an entry in an extension to a table of checks, and
executing a program of checks defined by said entry.

25. A method according to claim 22 further including the step of executing positive actions if the requested transition is enabled and if the checks associated with the requested transition are satisfied, comprising the steps of:
using an entry, corresponding to the requested transition, in an extension to a table of actions, and
executing a program of actions defined by said entry.

26. A method according to claim 22, further including the step of executing negative actions if the checks associated with the requested transition are not satisfied, comprising the steps of:
using an entry, corresponding to the requested transition, in an extension to a table of actions, and
executing a program of actions defined by said entry.

27. A method according to claim 22, further including the step of executing positive actions if the requested transition is enabled, of:
using an entry, corresponding to the requested transition, in an extension to the table of actions, and
executing a program of actions defined by said entry.

28. A method of controlling the life cycle of a portable electronic object, the life cycle being determined by a succession of state transitions, said states determining the services offered by the object, said object comprising a processing unit, a volatile memory, program memories and data memories, each of said memories having a content defining a plurality of configurations, said method being implemented, within the object, following a request for transition from a reference state to an additive state, comprising the steps of:
validating the enabling of said request by:
validating the enabling of a transition from said reference state to an additive state, whilst analysing a table of permitted transitions;
validating (the enabling of a transition from said reference state to said additive state, whilst analysing an extension to the table of permitted transitions, so that only certain transitions are permitted amongst all the transitions between any two possible states of the object; and
changing the state of the object to the additive state if the requested transition is enabled.

29. A method according to claim 28, further including the step of executing systematic actions comprising the steps of:
using an entry corresponding to the requested transition, in an extension to a table of actions, and
executing a program of actions defined by said entry.

30. A method according to claim 28, further including the step of evaluating the checks associated with the requested transition comprising the steps of:
using an entry in an extension to a table of checks, and
executing a programme of checks defined by said entry.

31. A method according to claim 28, further including the step of executing positive actions if the requested transition is enabled and if the checks associated with the requested transition are satisfied, comprising the steps of:

using an entry, corresponding to the requested transition, in an extension to a table of actions, and executing a program of actions defined by said entry.

32. A method according to claim 28, further including the step of executing negative actions if the checks associated with the requested transition are not satisfied, comprising the steps of:

using an entry, corresponding to the requested transition, in an extension to a table of actions, and executing a program of actions defined by said entry.

33. A method according to claim 28, further including the step of executing positive actions if the requested transition is enabled, of:

using an entry, corresponding to the requested transition, in an extension to the table of actions, and executing a program of actions defined by said entry.

34. A method according to claim 11, wherein said method does not enable the crossover of a state transition, from an additive state to a reference state.

35. The method according to claim 1, wherein said checking means determines whether said memories contain data that is invalid for the transition to be effected.

36. The method according to claim 11, wherein said evaluation step comprises checking whether said memories have a predetermined configuration associated with the transition from said current state to said new state.

* * * * *